July 25, 1944.  R. B. HITCHCOCK  2,354,264
SUPPORTING MEANS
Filed Dec. 19, 1942
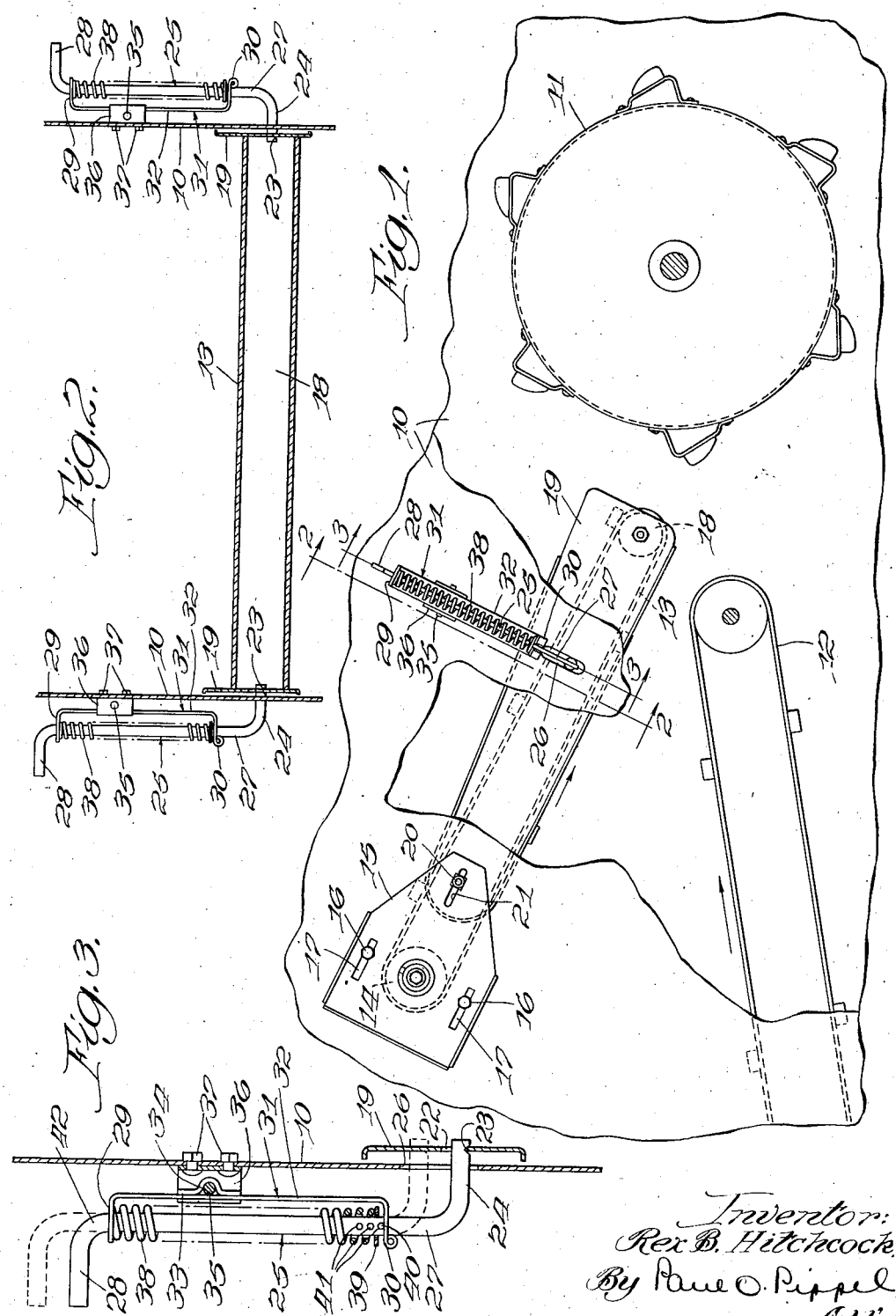
Inventor:
Rex B. Hitchcock
By Paul O. Pippel
Atty.

Patented July 25, 1944

2,354,264

UNITED STATES PATENT OFFICE 2,354,264

SUPPORTING MEANS

Rex B. Hitchcock, Evanston, Ill., assignor to International Harvester Company, a corporation of New Jersey Application December 19, 1942, Serial No. 469,584

20 Claims. (Cl. 130—27)

This invention relates to a supporting means. More specifically it relates to a supporting means for the upper conveyer of a pair of conveyers leading to a threshing cylinder.

In thresher constructions which involve spaced side walls, a thresher cylinder, and a pair of upper and lower conveyers leading to the threshing cylinder with the space between them converging in a direction toward the cylinder, it is desirable to have the conveyers arranged so that there may be adjustment between them at their ends adjacent the threshing cylinder for relieving any choking which may result from variation in the amount of flow of material to the threshing cylinder, and to have the upper conveyer movable completely away from the lower conveyer, so that access may be had to the space between the conveyers for cleaning or for other purposes. Since the conveyers in the threshing cylinder fit closely within the side walls of the thresher housing, it is necessary that the supporting means for the upper conveyer, which enables the upper conveyer to be adjusted with respect to the lower conveyer when closely adjacent the lower conveyer and also to be moved away from the lower conveyer, be mounted in the side walls of the thresher housing. The present application has to do with a supporting means of this sort.

An object of the present invention is to provide an improved supporting means.

A further object is the provision of an improved supporting means adapted to be mounted in a side wall.

Another object is to provide an improved supporting means applicable to a thresher construction.

A still further object is the provision of an improved supporting means for the upper conveyer of a pair of conveyers leading to a threshing cylinder.

Other objects will appear from the disclosure.

According to the present invention, the upper conveyer of a pair of conveyers leading to a threshing cylinder is supported by carriers slidably connected to the walls of the thresher housing, so that the upper conveyer may move up and down, and pivotally connected to the walls of the thresher housing, so that they may be detached from the upper conveyer, in order that the upper conveyer may be moved away from the lower conveyer.

In the drawing—

Figure 1 is a side view, with parts removed, of a portion of a thresher;

Figure 2 is a sectional view on line 2—2 of Figure 1; and

Figure 3 is a sectional view on line 3—3 of Figure 1.

There is shown in the drawing a thresher construction which involves a pair of spaced side walls 10, a threshing cylinder 11, a lower conveyer 12 leading to the threshing cylinder 11, and an upper conveyer 13 above the lower conveyer 12, also leading to the threshing cylinder 11. The threshing cylinder 11 and the lower conveyer 12 extend between the side walls 10 and are supported in the side walls in a manner not shown, since it forms no part of the present invention. The upper conveyer 13 is supported at its upper, outer end on a roller 14 journaled in plates 15, of which only one is shown, adjustably mounted in the side walls 10 and secured thereto by bolts 16 passing through elongated slots 17 which permit adjustment of the plates 15 with respect to the walls 10. The lower inner end of the upper conveyer 13 is supported upon a roller 18 journaled at its ends in side members 19 secured to the plates 15 by bolts 20 passing through elongated slots 21 in the plates 15.

As seen in Figure 3, each side member 19 has an elongated slot 22, which is engaged by a notch 23 in an end portion 24 of a carrier 25. The end portion 24 extends outwardly through an elongated slot 26 in a side wall 10. The carrier 25 has an intermediate portion 27 which extends upwardly along the outer side of the side wall 10 in parallel spaced relation thereto and has an upper end portion 28 extending outwardly from the side wall 10. The intermediate portion 27 of the carrier 25 extends in slidable relation through end portions 29 and 30 of a holder 31 having an extended intermediate portion 32. A bracket 33 is secured, as by soldering or welding, to the intermediate portion 32 of the holder 31 and is shaped so as to provide a space 34 between itself and the intermediate portion 32 of the holder 31 for a pin 35, which pivotally connects the holder 31 within the legs of a U-shaped member 36 secured by bolts 37 to the outer side of the side sheet or wall 10. A coil spring 38 surrounds the intermediate portion 27 of the carrier 25, and its upper end engages the upper end portion 29 of the holder 31 and its lower end engages a collar 39 adjustably fixed to the intermediate portion 27 of the carrier 25 by a cotter pin 40 insertable in any of a plurality of holes 41 in the intermediate portion 27 of the carrier 25.

From the foregoing it will be seen that the side members 19 supporting the lower end of the upper conveyer 13 adjacent the threshing cylinder 11 are supported upon the carrier members 25. The inner end of the upper conveyer 13 may be moved upwardly, the coil spring 38 resisting this movement and the intermediate portion 27 of the carrier 25 sliding through the end portions 29 of the holder 31. The lowermost position of the inner end of the upper conveyer 13 is determined by the engagement of the top of the slots 22 with the end portions 21 of the carrier 25 and the engagement of a curved portion 42 joining the intermediate portion 27 in the upper end portion 28 of the carrier 25 with the upper end portion 29 of the holder 31. During normal operation of the thresher construction, crops to be threshed are fed along the lower conveyer 12 toward the threshing cylinder 11 and are regulated in depth by the upper conveyer 13, which is quite near the lower conveyer 12 at its inner end adjacent the threshing cylinder 11. As the amount of material moving toward the threshing cylinder 11 varies, the inner end of the upper conveyer 13 may move up and down against the resultant action of the spring 38, since the carrier 25 may slide with respect to the holder 31.

When it is desired that access be provided to the space between the inner ends of the conveyers 12 and 13 and that accordingly the inner end of the upper conveyer 13 be moved away from the inner end of the lower conveyer 12, the upper end 28 of the carrier 25, serving as a control handle, is grasped and the carrier 25 is raised so that the notch 23 is disengaged from the lower edge of the slot 22 in the side member 19, and the end portion 24 of the carrier 25 is swung out of the slot 22 and outwardly through the slot 26 in the side wall 10 to the outer side of the side wall. This same procedure is followed for the carriers 25 at both sides of the conveyer 13 and then the conveyer 13 is free to be swung upwardly so that its inner end is moved away from inner end of the conveyer 12. The upward swinging of the conveyer 13 takes place about the bolts 20 as an axis and so the upper conveyer 13 loosens in the upward swinging.

From the foregoing description it will be apparent that a new and novel supporting means has been provided for a thresher construction. This supporting means enables an upper conveyer of a pair of conveyers leading to a threshing cylinder to be adjustably supported in close proximity to the lower conveyer for upward and downward movement in conformation with variation in flow of crops to the threshing cylinder. The supporting means is also so arranged that it may be readily disconnected from the upper conveyer so that the upper conveyer may be swung away from the lower conveyer for access to the space between the conveyers.

The novel supporting means of the present invention has been illustrated as applied to a thresher construction, but it will be understood that it has other applications. The intention is to limit the invention only within the scope of the appended claims.

What is claimed is:

1. In an assembly comprising a housing having a wall, a threshing cylinder within the housing, a lower conveyer within the housing leading toward the threshing cylinder, an upper conveyer positioned within the housing over the lower conveyer and leading toward the threshing cylinder, the combination therewith of means for adjusting the spacing between the conveyers for normal operation and for moving the upper conveyer away from the lower conveyer for cleaning, said means comprising a carrier for the upper conveyer detachably connected to the upper conveyer and extending through and along the outer side of one wall, and means forming a slidable and pivotal connection of the carrier with the outer side of the said one wall for providing the upper conveyer movement toward and away from the lower conveyer by virtue of the slidable connection and for providing detachment of the carrier from the upper conveyer and withdrawal of the carrier to the outer side of said wall by virtue of the pivotal connection.

2. In an assembly comprising a housing having a wall, a threshing cylinder within the housing, a lower conveyer within the housing leading toward the threshing cylinder, an upper conveyer positioned within the housing over the lower conveyer and leading toward the threshing cylinder, the combination therewith of means for adjusting the spacing between the conveyers for normal operation and for moving the upper conveyer away from the lower conveyer for cleaning, said means comprising a carrier for the upper conveyer detachably connected to the upper conveyer, and means forming a slidable and pivotal connection of the carrier with the said one wall for providing the upper conveyer movement toward and away from the lower conveyer by virtue of the slidable connection and for providing detachment of the carrier from the upper conveyer by virtue of the pivotal connection.

3. In an assembly comprising a housing having a wall, a threshing cylinder within the housing, a lower conveyer within the housing leading toward the threshing cylinder, an upper conveyer positioned within the housing over the lower conveyer and leading toward the threshing cylinder, the combination therewith of means for adjusting the spacing between the conveyers for normal operation and for moving the upper conveyer away from the lower conveyer for cleaning, said means comprising a carrier for the upper conveyer detachably connected to the upper conveyer, a holder providing slidable support for the carrier to enable the upper conveyer to move toward and away from the lower conveyer, and means pivotally connecting the holder to one wall to enable the carrier to be disconnected from the upper conveyer.

4. In an assembly comprising a housing having a wall, a threshing cylinder within the housing, a lower conveyer within the housing leading toward the threshing cylinder, an upper conveyer positioned within the housing over the lower conveyer and leading toward the threshing cylinder, the combination therewith of means for adjusting the spacing between the conveyers for normal operation and for moving the upper conveyer away from the lower conveyer for cleaning, said means comprising a carrier for the upper conveyer detachably connected to the upper conveyer, a holder positioned at the outer side of the said one wall and a holder providing slidable support for the carrier to enable the upper conveyer to move toward and away from the lower conveyer, and means pivotally connecting the holder to the said one wall to enable the carrier to be detached from the upper conveyer and to be withdrawn through the said one wall to the outer side thereof.

5. In an assembly comprising a pair of side walls, a threshing cylinder extending therebetween, a lower conveyer extending between the sides toward the threshing cylinder, and an upper conveyer extending toward the threshing cylinder over the lower conveyer between the side walls, the combination therewith of means for adjusting the upper conveyer toward and away from the lower conveyer for normal operation and for moving the upper conveyer away from the lower conveyer for cleaning, said means comprising a pair of side pieces for the upper conveyer having slots, a pair of carriers positioned at opposite sides of the upper conveyer, each carrier having a notched portion engaging a slot of a side piece and another portion extending through and along the outer side of a side wall, a pair of holders each slidably supporting a carrier at the portion thereof extending along the outer side of a side wall to enable the upper conveyer to be adjusted toward and away from the lower conveyer for normal operation, and means pivotally mounting the holders on the side walls to enable the notched portions of the carriers to be disengaged from the slots in the side pieces for the upper conveyer and to be withdrawn to the outer sides of the walls for enabling the upper conveyer to be moved away from the lower conveyer for cleaning.

6. The combination specified in claim 4 and further including resilient means acting between the holder and the carrier for resiliently urging the upper conveyer toward the lower conveyer.

7. The combination specified in claim 5 and further including resilient means acting between the holders and the carriers for resiliently urging the upper conveyer toward the lower conveyer.

8. In an assembly comprising a thresher housing having a side wall, a thresher cylinder, a lower conveyer leading to the thresher cylinder, and an upper conveyer over the lower conveyer leading to the thresher cylinder, the cylinder and the conveyers being at one side of the side wall, the combination therewith of means for maintaining the end of the upper conveyer adjacent the threshing cylinder in a certain position with limited movement from the said certain position for normal operation and for providing it with a substantial movement away from the said certain position for cleaning, said means comprising a carrier having a first end portion detachably engaging the upper conveyer and extending through the side wall, an intermediate portion extending along the other side of the side wall, and a second end portion extending outwardly from the said other side of the side wall and serving as a control handle for the carrier, a holder slidably supporting the carrier at the intermediate portion for providing the end of the upper conveyer adjacent the threshing cylinder with limited movement from the said certain position, and means pivotally connecting the holder to the said other side of the wall for enabling pivoting of the holder by actuation of the said second end portion serving as a control handle to disengage the said one end portion of the carrier from the upper conveyer and to withdraw the said one end portion to the said other side of the wall for permitting the end of the upper conveyer adjacent the thresher cylinder a substantial movement from the said certain position.

9. In an assembly comprising a thresher housing having a side wall, a thresher cylinder, a lower conveyer leading to the thresher cylinder, and an upper conveyer over the lower conveyer leading to the thresher cylinder, the cylinder and the conveyer being at one side of the side wall, the combination therewith of means for maintaining the end of the upper conveyer adjacent the threshing cylinder in a certain position with limited movement from the said certain position for normal operation and for providing it with a substantial movement away from the said certain position for cleaning, said means comprising a member adjacent the wall connected to the upper conveyer, a carrier having a notched end portion detachably engaging the member and extending through the side wall, an intermediate portion extending along the other side of the side wall, and an end portion extending outwardly from the said other side of the side wall and serving as a control handle for the carrier, a holder slidably supporting the carrier at the intermediate portion for providing the end of the upper conveyer adjacent the threshing cylinder with limited movement from the said certain position, and means pivotally connecting the holder to the said other side of the wall for enabling pivoting of the holder by actuation of the end portion serving as a control handle to disengage the notched end portion of the carrier from the member and to withdraw the notched end portion to the said other side of the wall for permitting the end of the upper conveyer adjacent the thresher cylinder a substantial movement from the said certain position.

10. In an assembly comprising a thresher housing having a pair of spaced side walls, a thresher cylinder, a lower conveyer leading to the threshing cylinder, an upper conveyer over the lower conveyer leading to the threshing cylinder, the cylinder and the conveyers being between the side walls, the combination therewith of means for maintaining the end of the upper conveyer adjacent the threshing cylinder in a certain position with limited movement from the said certain position for normal operation and for providing it with a substantial movement away from the said certain position for cleaning, said means comprising a pair of carriers each having a first end portion detachably engaging opposite sides of the upper conveyer and extending through the side walls, an intermediate portion extending along the outer side of a side wall and a second end portion extending outwardly from the outer side of a side wall and serving as a control handle for the carrier, a pair of holders slidably supporting the intermediate portion of the carrier for providing the upper end of the conveyer adjacent the threshing cylinder with limited movement from the said certain position, and means pivotally connecting the holders to the outer sides of the side walls for enabling pivoting of the holders by the actuation of the said second end portions of the carriers serving as control handles to disengage the said first end portions of the carriers from the upper conveyer and to withdraw the said first end portions to the outer sides of the side walls for permitting the end of the upper conveyer adjacent the thresher cylinder a substantial movement away from the said certain position.

11. In an assembly comprising a thresher housing having a pair of spaced side walls, a thresher cylinder, a lower conveyer leading to the threshing cylinder, an upper conveyer over the lower conveyer leading to the threshing cylinder, the cylinder and the conveyers being between the side walls, the combination therewith of means for maintaining the end of the upper conveyer adjacent the threshing cylinder in a certain position with limited movement from the said certain position for normal operation and for providing it with a substantial movement away from the said certain position for cleaning, said means comprising a pair of members having slots and being connected to opposite sides of the upper conveyer adjacent the side walls, a pair of carriers each having a notched end portion detachably engaging the slots in the members and extending through the side walls, an intermediate portion extending along the outer side of a side wall, and an end portion extending outwardly from the outer side of a side wall and serving as a control handle for the carrier, a pair of holders slidably supporting the intermediate portion of the carrier for providing the upper end of the conveyer adjacent the threshing cylinder with limited movement from the said certain position, and means pivotally connecting the holders to the outer sides of the side walls for enabling pivoting of the holders by the actuation of the end portions of the carriers serving as control handles to disengage the notched end portions of the carriers from the slots in the members and to withdraw the notched end portions to the outer sides of the side walls for permitting the end of the upper conveyer adjacent the thresher cylinder a substantial movement away from the said certain position.

12. An assembly comprising a housing having a wall, a conveyer within the housing, and means for adjusting the conveyer comprising a carrier for the conveyer detachably connected to the conveyer and extending through and along the outer side of one wall and means forming a slidable and pivotal connection of the carrier with the outer side of the said one wall for providing the conveyer movement up and down by virtue of the slidable connection and for providing detachment of the carrier from the conveyer and withdrawal of the carrier to the outer side of said wall by virtue of the pivotal connection.

13. An assembly comprising a housing having a wall, a conveyer within the housing, and means for adjusting the conveyer comprising a carrier for the conveyer detachably connected to the conveyer, and means forming a slidable and pivotal connection of the carrier with the said one wall for providing the conveyer movement up and down by virtue of the slidable connection and for providing detachment of the carrier from the conveyer by virtue of the pivotal connection.

14. An assembly comprising a housing having a wall, a conveyer within the housing, and means for adjusting the conveyer comprising a carrier for the conveyer detachably connected to the conveyer, a holder providing slidable support for the carrier to enable the conveyer to move up and down, and means pivotally connecting the holder to one wall to enable the carrier to be disconnected from the conveyer.

15. An assembly comprising a housing having a wall, a conveyer within the housing, and means for adjusting the conveyer comprising a carrier for the conveyer detachably connected to the conveyer, a holder positioned at the outer side of the said one wall and a holder providing slidable support for the carrier to enable the conveyer to move up and down, and means pivotally connecting the holder to the said one wall to enable the carrier to be detached from the conveyer and to be withdrawn through the said one wall to the outer side thereof.

16. An assembly comprising a housing having a pair of side walls, a conveyer extending between the side walls, and means for adjusting the conveyer comprising a pair of side pieces for the conveyer having slots, a pair of carriers positioned at opposite sides of the conveyer, each carrier having a notched portion engaging a slot of a side piece and another portion extending through and along the outer side of a side wall, a pair of holders each slidably supporting a carrier at the portion thereof extending along the outer side of a side wall to enable the conveyer to be adjusted up and down for normal operation, and means pivotally mounting the holders on the side walls to enable the notched portions of the carriers to be disengaged from the slots in the side pieces for the conveyer and to be withdrawn to the outer sides of the walls.

17. An assembly comprising a housing having a side wall, a conveyer at one side of the side wall, and means for maintaining one end of the conveyer in a certain position with limited movement from the said certain position for normal operation and for providing it with a substantial movement away from the said certain position, said means comprising a carrier having a first end portion detachably engaging the conveyer and extending through the side wall, an intermediate portion extending along the other side of the side wall, and a second end portion extending outwardly from the said other side of the side wall and serving as a control handle for the carrier, a holder slidably supporting the carrier at the intermediate portion for providing the end of the conveyer with limited movement from the said certain position, and means pivotally connecting the holder to the said other side of the wall for enabling pivoting of the holder by actuation of the said second end portion serving as a control handle to disengage the said one end portion of the carrier from the conveyer and to withdraw the said one end portion to the said other side of the wall for permitting the end of the conveyer a substantial movement from the said certain position.

18. An assembly comprising a housing having a side wall, a conveyer at one side of the side wall, and means for maintaining one end of the conveyer in a certain position with limited movement from the said certain position for normal operation and for providing it with a substantial movement away from the said certain position, said means comprising a member adjacent the wall connected to the conveyer, a carrier having a notched end portion detachably engaging the member and extending through the side wall, an intermediate portion extending along the other side of the side wall, and an end portion extending outwardly from the said other side of the side wall and serving as a control handle for the carrier, a holder slidably supporting the carrier at the intermediate portion for providing the end of the conveyer with limited movement from the said certain position, and means pivotally connecting the holder to the said other side of the wall for enabling pivoting of the holder by actuation of the end portion serving as a control handle to disengage the notched end portion of the carrier from the member and to withdraw the notched end portion to the said other side of the wall for permitting the end of the conveyer a substantial movement from the said certain position.

19. An assembly comprising a housing having a pair of spaced side walls, a conveyer between the side walls, and means for maintaining one end of the conveyer in a certain position with limited movement from the said certain position for normal operation and for providing it with a substantial movement away from the said certain position, said means comprising a pair of carriers each having a first end portion detachably engaging opposite sides of the conveyer and extending through the side walls, an intermediate portion extending along the outer side of a side wall and a second end portion extending outwardly from the outer side of a side wall and serving as a control handle for the carrier, a pair of holders slidably supporting the intermediate portion of the carrier for providing the end of the conveyer with limited movement from the said certain position, and means pivotally connecting the holders to the outer sides of the side walls for enabling pivoting of the holders by the actuation of the said second end portions of the carriers serving as control handles to disengage the said first end portions of the carriers from the conveyer and to withdraw the said first end portions to the outer sides of the side walls for permitting the end of the conveyer a substantial movement away from the said certain position.

20. An assembly comprising a housing having a pair of spaced side walls, a conveyer between the side walls, the combination therewith of means for maintaining one end of the conveyer with limited movement from the said certain position for normal operation and for providing it with a substantial movement away from the said certain position, said means comprising a pair of members having slots and being connected to opposite sides of the conveyer adjacent the side walls, a pair of carriers each having a notched end portion detachably engaging the slots in the members and extending through the side walls, an intermediate portion extending along the outer side of a side wall, and an end portion extending outwardly from the outer side of a side wall and serving as a control handle for the carrier, a pair of holders slidably supporting the intermediate portion of the carrier for providing the end of the conveyer with limited movement from the said certain position, and means pivotally connecting the holders to the outer sides of the side walls for enabling pivoting of the holders by the actuation of the end portions of the carriers serving as control handles to disengage the notched end portions of the carriers from the slots in the members and to withdraw the notched end portions to the outer sides of the side walls for permitting the end of the conveyer a substantial movement away from the said certain position.

REX B. HITCHCOCK.